United States Patent
Magyar et al.

(10) Patent No.: US 8,881,243 B2
(45) Date of Patent: Nov. 4, 2014

(54) DATA TRAFFIC CONTROL IN A COMMUNICATION NETWORK

(75) Inventors: Gábor Magyar, Kecskemét (HU); László Kovács, Martonvásár (HU); Andras Valkó, Hässelby (SE); András Veres, Budapest (HU)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 37 days.

(21) Appl. No.: 13/510,685

(22) PCT Filed: Nov. 24, 2009

(86) PCT No.: PCT/EP2009/065703
§ 371 (c)(1),
(2), (4) Date: Jun. 7, 2012

(87) PCT Pub. No.: WO2011/063825
PCT Pub. Date: Jun. 3, 2011

(65) Prior Publication Data
US 2013/0133041 A1 May 23, 2013

(51) Int. Cl.
*H04L 29/08* (2006.01)
*H04L 29/06* (2006.01)

(52) U.S. Cl.
CPC ............. *H04L 63/10* (2013.01); *H04L 67/322* (2013.01)
USPC ............................................. 726/4; 370/229

(58) Field of Classification Search
USPC .............................................. 726/4; 370/229
See application file for complete search history.

(56) References Cited

U.S. PATENT DOCUMENTS

| | | | | |
|---|---|---|---|---|
| 5,848,139 | A * | 12/1998 | Grover | 379/114.01 |
| 6,236,650 | B1 | 5/2001 | Le Dantec et al. | |
| 6,404,738 | B1 * | 6/2002 | Reininger et al. | 370/236 |
| 6,640,248 | B1 * | 10/2003 | Jorgensen | 709/226 |
| 6,937,566 | B1 * | 8/2005 | Forslow | 370/231 |
| 7,496,674 | B2 * | 2/2009 | Jorgensen | 709/230 |
| 7,680,035 | B2 * | 3/2010 | Krishnan | 370/229 |
| 7,966,648 | B2 * | 6/2011 | Park et al. | 726/2 |
| 8,068,875 | B2 * | 11/2011 | Nagai | 455/561 |
| 2002/0093930 | A1 * | 7/2002 | Dertz et al. | 370/337 |
| 2004/0068668 | A1 * | 4/2004 | Lor et al. | 713/201 |
| 2006/0264177 | A1 * | 11/2006 | Heidari-Bateni et al. | 455/62 |
| 2008/0316992 | A1 | 12/2008 | Shait et al. | |
| 2009/0129307 | A1 * | 5/2009 | Akhtar et al. | 370/312 |
| 2009/0252102 | A1 * | 10/2009 | Seidel et al. | 370/329 |
| 2010/0058406 | A1 * | 3/2010 | Xu et al. | 725/97 |
| 2010/0322329 | A1 * | 12/2010 | Yoo et al. | 375/260 |

FOREIGN PATENT DOCUMENTS

| | | | |
|---|---|---|---|
| EP | 1278390 A1 | 1/2003 | |
| WO | 2005055528 A1 | 6/2005 | |

* cited by examiner

*Primary Examiner* — Techane Gergiso
(74) *Attorney, Agent, or Firm* — Coats & Bennett, PLLC

(57) ABSTRACT

A method and apparatus for controlling data traffic in a communications network. The server determines that network conditions are suitable for sending delay tolerant data traffic, and as a result of the determination, it transmits a grant message to at least one client device, the grant message informing the client device that it is permitted to send or receive delay tolerant data traffic.

13 Claims, 3 Drawing Sheets

DATA TRAFFIC CONTROL IN A COMMUNICATION NETWORK

TECHNICAL FIELD

The invention relates to the field of data traffic control in a communication network.

BACKGROUND

Mobile communications networks are an increasingly popular way for their users to communicate with one another. The number of mobile subscribers is increasing, and with more and more applications and media content available to the subscribers, the amount of data traffic that each subscriber sends or receives is also increasing. Increasing numbers of subscribers and increasing amounts of data traffic place a burden on mobile communications networks. Mobile networks have limitations on their capacity per geographical area (e.g., cell), and so require careful distribution of resources for data traffic.

If the amount of data traffic in a mobile network exceeds a certain limit, then the mobile network can become congested, as the available radio resources, as well as other resources, are finite. Congestion impacts the quality of service received by subscribers if data becomes dropped or delayed. Furthermore, congestion can impact the total amount of traffic carried by the network, since certain applications that get lower access rate in peak hours might not be possible to compensate at times when there is free capacity.

Some client applications can tolerate delays of up to several seconds, minutes or even hours. For example, a subscriber may wish to download a movie for later viewing. The subscriber may wait until a time when there is no congestion in the network before beginning the download, to ensure that they get a faster download rate. Similarly, in machine to machine (M2M) applications, it may be acceptable for sensors reporting measurement to delay transmission to a period when there is no congestion in the network. A third example is an application that regularly generates keep-alive messages. Keep-alive messages cannot be delayed for hours, but can typically be delayed for several seconds without adversely affecting the application. A further example of data traffic that can tolerate a delay is regular news updates to the subscriber.

In order to best utilize the network resources, and to ensure that all subscribers get a required best Quality of Service (QoS) if they are sending or receiving data traffic (such as a live media stream) which cannot tolerate delay, it would be beneficial to reduce congestion by avoiding transmitting data traffic that can tolerate some delay at congestion periods, and to transmit such data traffic them at low-traffic periods instead.

A simple way to address the problem of congestion is for network operators to update their networks and provide more bandwidth and hardware to handle the increase in data traffic. This solution is expensive.

Another known way to address the problem is to limit data traffic of a certain type that is known to be bandwidth-intensive. For example, peer to peer (P2P) data traffic typically consumes a lot of resources, making those resources unavailable for other applications such as Web browsing. Operators therefore typically install certain tools/logic/policy control into their system which throttles P2P traffic during predetermined times of congestion. This works by limiting the total amount of bandwidth available to P2P traffic to a relatively low value for all users in a particular cell during the predetermined times of congestion.

A problem with P2P throttling is that it is performed on a whole class of traffic, and is not performed on the basis of an individual subscriber, cell, or time-of-day basis. Instead, throttling is applied to all subscribers in all cells in the predetermined time period. P2P traffic is not throttled dynamically, so cannot take account of congestion or QoS degradation in periods outside the predetermined time period.

Another approach to mitigate the problem of congestion, described in WO 2005/022941, is to explicitly define a download time for a not so urgent object download. The download time is set in advance by the user manually, for example to a night hour when congestion is less likely. Some operators provide financial incentives for users to schedule their data traffic at low-traffic periods. For example, in mobile networks that charge per minute, prices are typically lower at night, when congestion is less likely, than during the day.

Many subscribers schedule their data traffic at low-traffic time periods manually, simply to obtain faster data traffic rates. For example, P2P users who notice that data transfer speeds are higher in the early morning hours can schedule their P2P applications accordingly.

The delayed download mechanisms rely on the subscriber's knowledge of times of low congestion or times when per-minute charging is lower. If the download time is set in advance, there is no guarantee that there will be no congestion at the set time.

SUMMARY

It is an object of the invention to reduce congestion and maintain QoS for subscribers in mobile networks by providing an improved mechanism for scheduling the sending and receiving of data traffic that can tolerate delay.

According to a first aspect of the invention, there is provided a client device for use in a communications network. The client device is provided with an application for handling delay tolerant data traffic, and a receiver for receiving from a server located in the communications network a grant permission message. The grant permission message informs the application that it is permitted to send or receive delay tolerant data traffic. The application is arranged to send or receive delay tolerant data traffic as a result of receiving the grant permission message. In this way, data traffic that is marked as delay tolerant is only sent or received by the client device when the client device receives permission from the server, and so congestion is minimised as the server will not grant permission during periods of congestion.

As an option, the client device has a processor adapted to determine whether the grant permission message includes information identifying a set of client devices to which the client device belongs and, in the event that the permission message includes information identifying a set of client devices to which the client device belongs, allowing the application to handle delay tolerant data traffic. This allows the server to "mask" which client devices can send or receive delay tolerant traffic, thereby preventing all client devices from flooding the network by sending and receiving delay tolerant data traffic at the same time.

Delay tolerant traffic may be marked by a user of the client device as delay tolerant. Alternatively, whole classes of traffic may be marked as delay tolerant depending on a subscription or other options selected by the user of the client device.

An example of a client device is a mobile terminal, although it will be appreciated that a client device may be any type of client device that sends and/or receives data, such as a personal computer, a personal digital assistant, a set top box, a machine-to-machine network device and so on.

According to a second aspect of the invention, there is provided a server for use in a communications network. The server is provided with a network determining function for determining that network conditions are suitable for transmitting delay tolerant data traffic. Suitable conditions include, for example, a tolerable degree of congestion or packet loss. A message generation function is provided for generating a grant message for informing a client device that it is permitted to send or receive delay tolerant data traffic, and a transmitter is provided for transmitting the grant message to the client device.

The message generation function is optionally arranged to include further information in the grant message. Examples of further information include a grant time period, a maximum data rate in any of an uplink and downlink direction, a maximum bandwidth usable by delay tolerant data traffic in any of an uplink and downlink direction, a type of delay tolerant data traffic, and a location in which delay tolerant data traffic may be transmitted or received, the location being selected from one of a geographical location, a territory, and one or more network cells.

In order to reduce flooding of the network when delay tolerant data traffic is permitted to be sent or received, the server is optionally provided with a client device masking function for selecting a set of client devices from a larger pool of client devices, and either transmitting the grant message to the selected set of client devices, or including information identifying the set of client devices in the grant message, such that the grant message is only valid for client devices belonging to the selected set of client devices in the case of a broadcast of the grant message.

The server optionally comprises a receiver for receiving from the client device an indication that the client device wishes to send or receive delay tolerant data traffic, and a memory for storing an identity of the client device and the indication that the client device wishes to send or receive delay tolerant data traffic. This allows a client device to register with the server as having delay tolerant data traffic to send or receive, and so the server transmitter need only be arranged to transmit the grant message to client devices identified in the database. This reduces signalling.

The server may be a standalone server, or may be part of another network element such as a base station.

According to a third aspect of the invention, there is provided a method of controlling data traffic in a communications network. The server determines that network conditions are suitable for sending delay tolerant data traffic, and as a result of the determination, it transmits a grant message to at least one client device, the grant message informing the client device that it is permitted to send or receive delay tolerant data traffic.

The grant message is optionally sent as one of a unicast message to a particular client device, a multicast to particular client devices, or a broadcast to all client devices in networks served by the server.

As an option, the grant message includes further information. Examples of further information include a grant time period, a maximum data rate in any of an uplink and downlink direction, a maximum bandwidth usable by delay tolerant data traffic in any of an uplink and downlink direction, a type of delay tolerant data traffic, and a location in which delay tolerant data traffic may be transmitted or received, the location being selected from one of a geographical location, a territory, and one or more network cells.

As an option, prior to transmitting the grant message, the server selects a set of client devices from a larger pool of client devices and either transmits the grant message to the selected set of client devices, or includes information identifying the set of client devices in the grant message, such that the grant message is only valid for client devices belonging to the selected set of client devices. This reduces the risk of congestion caused by all client devices attempting to send and receive delay tolerant data traffic at the same time.

As an option, the server determines that network conditions are no longer suitable for sending delay tolerant data traffic and, as a result of the determination, transmits a stop message to the at least one client device, the stop message informing the client device that it is not permitted to send or receive delay tolerant data traffic. This ensures that if the network conditions deteriorate before the expiration of a grant time period, the server can prematurely revoke the permission to send or receive delay tolerant data traffic.

The method optionally comprises receiving from the client device an indication that the client device wishes to send or receive delay tolerant data traffic, storing an identity of the client device and the indication that the client device wishes to send or receive delay tolerant data traffic in a database, and transmitting the grant message to only client devices identified in the database. This reduces unnecessary signalling by ensuring that only those client devices that are registered with the server receive the grant message.

According to a fourth aspect of the invention, there is provided a computer program comprising computer readable code which, when run on a client device, causes the client device to behave as described above in the first specific embodiment of the invention.

According to a fifth aspect of the invention, there is provided a computer program comprising computer readable code which, when run on a server, causes the server to behave as described above in the second specific embodiment of the invention.

According to a sixth aspect of the invention, there is provided a computer program product comprising a computer readable and a computer program as described above in either of the third or fourth specific embodiments of the invention, wherein the computer program is stored on the computer readable medium.

DETAILED DESCRIPTION

Figure 1:
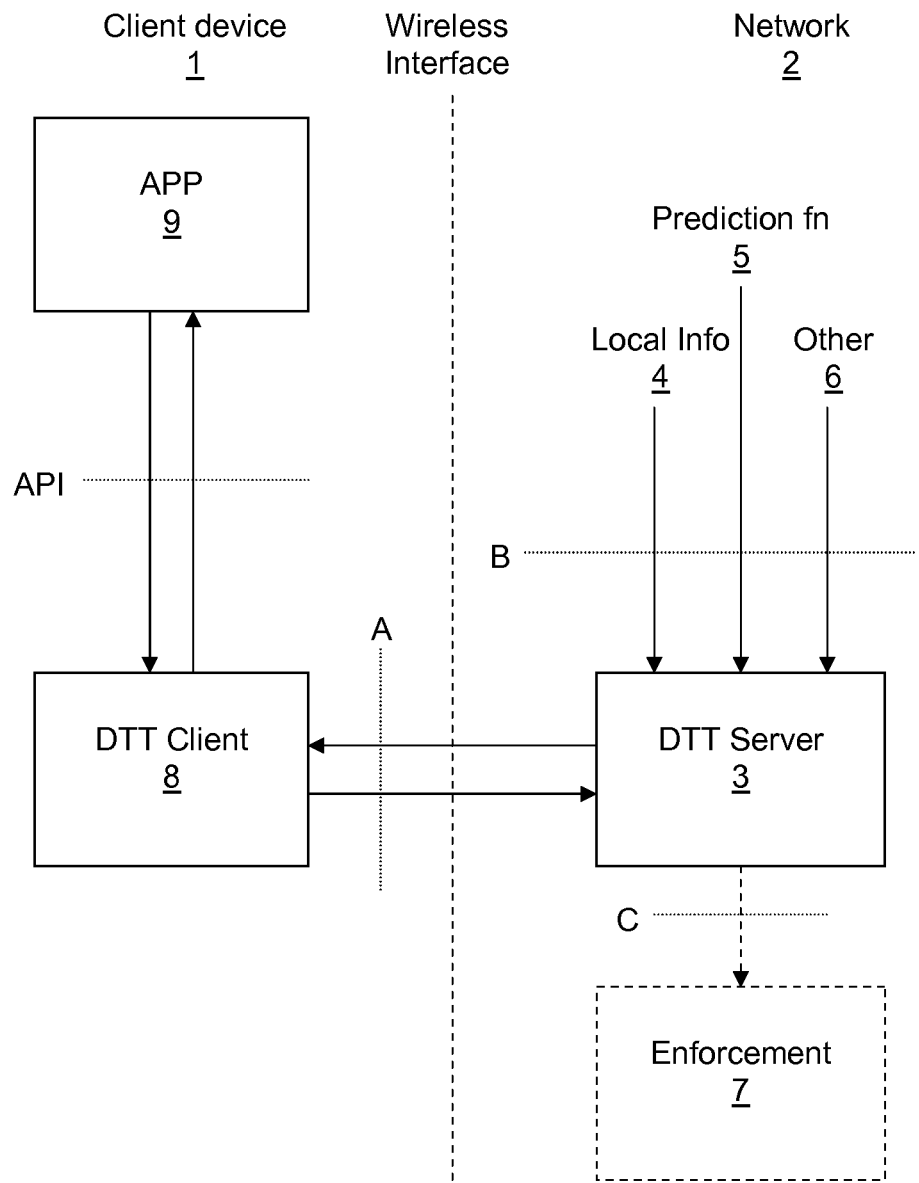
FIG. 1 illustrates schematically in a block diagram a network architecture according to an embodiment of the invention.

Referring to FIG. 1 herein, there is illustrated network architecture at both a client device User Equipment (UE) 1 and the network (NW) 2. A Delay Tolerant Traffic (DTT) Server 3 is located in the network, and is concerned with controlling when delay tolerant traffic can be transmitted. The DTT Server 3 continuously monitors the data traffic load on the network 2, and identifies periods and locations (for example cells in a mobile communications network) that are experiencing periods of low data traffic.

When the DTT Server 3 determines that a particular cell is experiencing low data traffic, it sends a message to the client device 1 granting the client device 1 permission to begin sending or receiving data traffic that has been determined to be delay tolerant. In this way, delay tolerant data traffic is only sent when the dynamically monitored network conditions allow.

The DTT Server 3 is a single logical function, but it can be implemented in a distributed way. For example, a single server entity may server a network region, and may be co-located or integrated with other network functions, such as Radio Network Controller (RNC) or Access Gateway.

The DTT Server 3 can operate either on a subscription basis, in which case client devices 1 that have delay tolerant traffic to send or receive subscribe to updates, or on a broadcast basis in which the DTT server 3 sends a grant permission in a broadcast message to all client devices in the cells served by the DTT Server 3. If the DTT Server 3 is operating on a subscription basis, then it can maintain a database of subscribing client devices 1.

The DTT Server 3 obtains information via interface B about the network conditions. This may include local information 4, information from a prediction function 5 (which may be co-located with the DTT Server 3 and other information sources 6.

Based on input received through interface B, and also on information about subscribing client devices 1 in the database (if applicable), the DTT Server 3 decides when and where to grant permission for client devices 1 to send and receive delay tolerant data traffic. For example, a possible algorithm is to enable delay tolerant data traffic in each base station where the radio resource utilization is below 50%. More sophisticated algorithms may take into account the load in various network components (such as radio, core, transport), as well as traffic prediction.

The DTT Server 3 uses interface A to send a grant permission message to client devices 1 when it permits delay tolerant traffic. In addition, interface C allows the DTT Server 3 to control an enforcement function 7, which may be co-located with the DTT Server 3.

Where the client device 1 registers a request for sending or receiving delay tolerant data traffic with the DTT Server 3, it sends a registration request using a DTT Client 8 via interface A. In the simplest case, the registration request may be simply an indication that the client device 1 has delay tolerant data traffic for sending. However, the request may include more details about the delay tolerant data traffic, examples of which include:

Whether the data traffic is an upload or download;
an estimated amount of traffic;
an amount of delay that the data traffic can tolerate
Etc.

Interface A is used by the DTT Server 3 to send a grant permission to the client devices (either to those client devices that have registered that they have delay tolerant traffic waiting, or to all client devices in cells served by the DTT Server 3). Where the client device 2 has registered with the DTT Server 3, the grant permission message can be sent using a unicast, multicast or broadcast message. Where the client device 1 does not need to register with the DTT Server 3, the grant permission message is broadcast to all client devices.

The grant permission message may hold information about the maximum allowed amount and rate of delay tolerant data traffic, as well as a minimum duration of the grant period during which delay tolerant data traffic can be sent or received. If the grant period is specified, it may be renewed periodically before the expiry. For example, the grant permission may be valid for 15 minutes, which can be refreshed if needed and if network conditions allow. If a grant permission expiry time is not specified, then the DTT Server 3 can send an explicit delay tolerant data traffic grant-end message. In some situations, for example, if network conditions deteriorate, the DTT server 3 may send a grant-end message even before a previously specified grant period has expired.

Interface A can be implemented in the network by appropriate extensions of existing interfaces in mobile communication networks, for example, the PDP context setup request/response messages.

As described above, the DTT Server 3 receives input from other network entities through interface B regarding the load level in various network resources. For example, at regular time intervals, each base station can provide local information 4 reporting the radio resource utilization in each cell. As another example, a data traffic monitoring function located in the mobile core network can report total data traffic carried in the core network. As a third example, a prediction function 5 can make traffic forecasts based on current and previous measurements and report to the DTT Server.

Interface B may be poll based. In other words, the DTT Server 3 contacts other network entities to receive information about network conditions. Alternatively, information may be pushed by the other network entities towards the DTT Server 3 without the DTT Server having to request this information.

Interface C is used by the DTT Server 3 to control the enforcement function 7. The enforcement function 7 separates delay tolerant data traffic from non-delay tolerant data traffic. For delay tolerant data traffic, a special charging record may be created. For example, a subscriber may be offered a lower charging rate if they agree to mark traffic as delay tolerant. The enforcement function 7 receives grant permission messages from the DTT Server 3, to allow it to identify delay tolerant data traffic. The enforcement function 7 blocks all delay tolerant traffic that is sent outside of a grant period, although it may allow a short tolerance period at the end of the grant-period.

The application 9 at the client device 1 that is responsible for sending or receiving delay tolerant data traffic receives delay tolerant data traffic control signalling from the DTT Server 3 via the DTT Client 8 at the client device 1. This may be implemented at the client device 1 as an Application Programming Interface (API) in many ways, depending on the Operating System running at the client device 1.

The application 9 is capable of initiating sending or receiving of delay tolerant data traffic whenever the API triggers the start period. The application 9 is also capable of estimating whether the DTT grant time period is sufficient for the delay tolerant data traffic to be sent or received. If the grant period has expired, the application 9 must stop transmitting or receiving delay tolerant data traffic within a short time (typically a few round-trip times, approx 1 sec) necessary to finish ongoing transactions. Of course, partial downloads may be managed, and the application 9 may also have functionality to prioritise which delay tolerant data traffic is to be sent/received. For example, if the application 9 is aware that it needs to send a short message, and it needs to download a large file, and the grant time period is short, it may be better to prioritize the sending of the short message before downloading the large file. Similarly, it may reserve the downloading of large files until such as time as a long grant time period is allowed.

Where the client device 1 must register with the DTT Server 3, the API handles the registration process.

The registration based embodiment requires that the DTT Server 3 knows which client devices have subscribed to updates for when they can send/receive delay tolerant data traffic possibility. This can be achieved in many ways, as will be apparent to a person of skill in the art.

One method is to set up a special "sleeping" Packet Data Protocol (PDP) context for delay tolerant traffic demand by the client device 1. The DTT Server 3 will wake up the client device 1 and grant resources when the delay tolerant data traffic availability for the client device 1 is scheduled. An alternative method is for the client device 1 to register the demand for delay tolerant data traffic with the DTT Server 3, which maintains the requests internally. The DTT Server 3 signals the client device 1 when it can start sending/receiving delay tolerant data traffic, after which the PDP setup takes place.

There are several ways in which data traffic can be determined as being delay tolerant. A first way is for the subscriber to mark the traffic. For example, when a subscriber wishes to download a movie, he may be offered the choice of delay tolerant or not. The subscriber can then decide whether he accepts that the download will be delay tolerant, and if so he may be rewarded with a lower price.

Another option is for the network operator to determine that classes of data traffic must all be delay tolerant. For example, all movies in a particular network must be sent using delay tolerant traffic control.

A further way is for an operator to determine that certain classes of traffic must be delay tolerant if the subscriber is on a certain tariff. For example, if a subscriber is on a premium tariff, then none of his traffic is marked as delay tolerant. On the other hand, if the subscriber is on a reduced rate tariff, then certain classes of traffic may be marked as delay tolerant. It will be apparent that there are other ways in which traffic can be determined to be delay tolerant.

It is possible to use the proposed system between different radio access technologies (RAT): The system can suggest switching back to 2.5G (EDGE) from 3G or vice versa, or use the latest LTE technology available instead of 3G, in the event that the client device is capable of using multiple RATs. In this way, if one RAT is too congested to allow the sending or receiving of delay tolerant traffic, but the other RAT is not, the client device can switch to the uncongested RAT for the sending or receiving of delay tolerant data traffic.

The timescale for delay tolerant data traffic signalling can vary depending on network conditions from a matter of seconds to a matter of hours.

In some circumstances, where a lot of subscribers have delay tolerant traffic to send or receive, the granting of a delay tolerant traffic time period could cause rapid congestion of the network. In this case, the DTT Server 3 may include, in the grant permission message, limits on which client devices 1 can send or receive delay tolerant data traffic. For example, the grant permission message may only allow client devices having an International Mobile Subscriber Identity (IMSI) ending with the number "1" to send and receive. When that grant permission time period ends, the next grant permission may be granted to client devices having an IMSI ending with the number "2", and so on. This "masking" of which client devices the grant permission applies to can be sent in a broadcast to all client devices in networks served by the DTT Server 3, or sent in a unicast or multicast to only the selected client devices. Of course, there are many other ways in which masking of client devices can be performed, and the above is suggested by way of example only.

Figure 2:
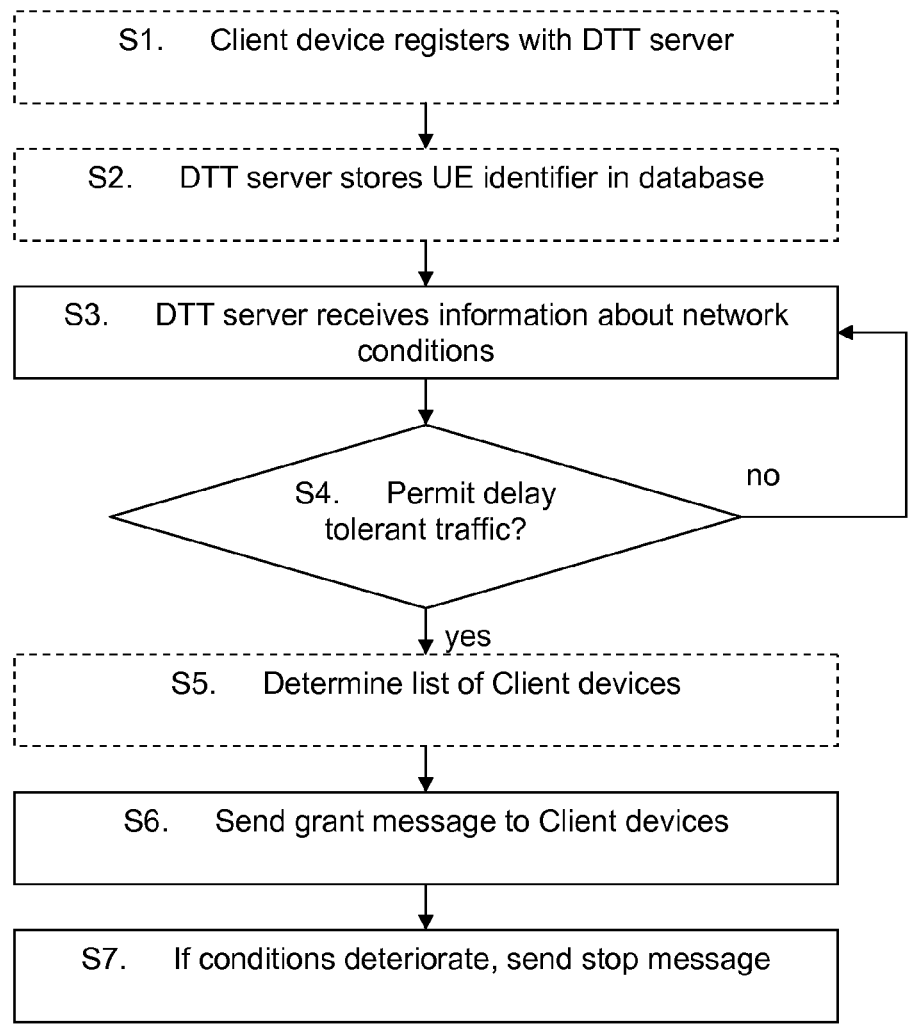
FIG. 2 is a flow diagram illustrating steps according to an embodiment of the invention.

Steps of embodiments of the invention are summarized in FIG. 2, with the following numbering corresponding to the numbering of FIG. 2, and dashed lines representing steps from the alternative embodiment described above:

S1. In the embodiment in which the client device 1 registers with the DTT server 3, it determines that it wishes to send or receive delay tolerant data traffic and sends a signal to the server.

S2. The DTT server 3 receives the signal and stores an identity of the client device in a database.

S3. The DTT server 3 receives information from other sources about network conditions.

S4. On the basis of the information about network conditions, the server decides whether or not to permit the transmission of delay tolerant data traffic. If not, then the method reverts to step S3, if so then the method continues at step S5.

S5. In the embodiment in which the client device 1 registers with the DTT server 3, the DTT server 3 determines a list of client devices to which to send a grant permission message from those client devices identified in its database.

S6. The grant message is sent to the list of client devices, or in the case of the embodiment where the client device 1 does not register with the DTT server 3, the grant message is broadcast to all client devices in the networks served by the DTT server 3. As described above, the grant message may includes further information, for example of a grant time period, a maximum data rate, a maximum bandwidth usable by delay tolerant data traffic, and a type of delay tolerant data traffic. It may also include a location in which delay tolerant data traffic may be transmitted or received. In a further embodiment, the grant message may include information identifying particular client devices that are permitted to send or receive delay tolerant data traffic.

S7. The DTT Server 3 may determine that network conditions have deteriorated, in which case it may send a stop message (either by broadcast or the selected client devices) to revoke the permission to send and receive delay tolerant traffic.

Figure 3:
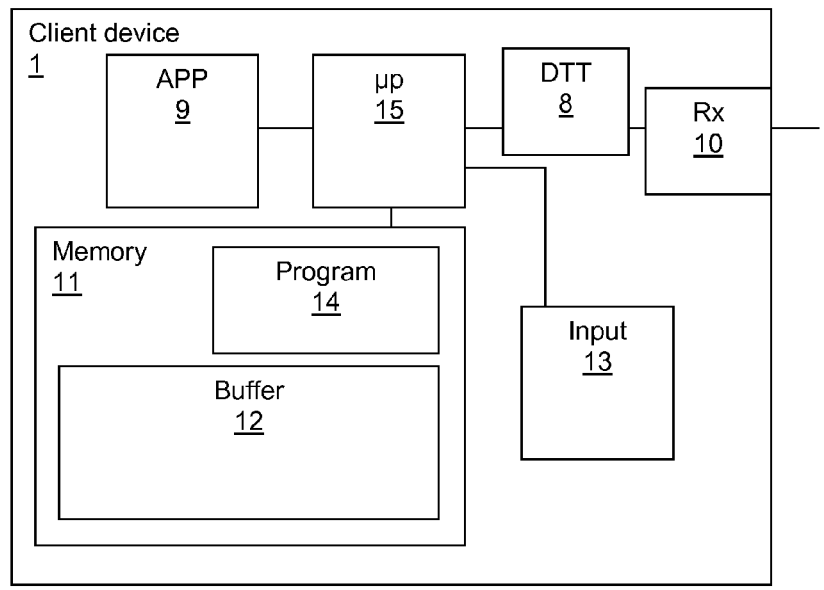
FIG. 3 illustrates schematically in a block diagram a client device according to an embodiment of the invention.

Turning to FIG. 3, a client device 1 is provided with an application 9 that handles delay tolerant data traffic. This may be, for example, a download manager, an email application, or any type of application that must send or receive data. A receiver 10 is provided for receiving the grant permission message from the DTT server 3. The grant permission message informs the application 9 that it is permitted to send or receive delay tolerant data traffic. The application is arranged to send or receive delay tolerant data traffic as a result of receiving the grant permission message. The client device is also provided with a memory 11 which may have a buffer portion 12 for storing delay tolerant data traffic prior to sending, although this is not necessary for all applications. The client device 1 may also, in one embodiment, be provided with a user input device 13 for allowing a user to input instructions as to whether data traffic should be considered to be delay tolerant or not.

Of course, the client device may have several different applications that make use of the DTT client 8, and use the DTT client 8 to register a request for sending or receiving delay tolerant data traffic with the DTT Server 3, as described above. The DTT client 8, once it receives a grant permission message from the DTT server 3, informs the application(s) that they can start sending or receiving their delay tolerant data traffic.

It will be appreciated that the invention may be implemented in a hardware or software embodiment. If the invention is implemented as software, then a software program 14 is stored in the computer readable memory 11, and a processor 15 is provided for executing the program 14.

Figure 4:
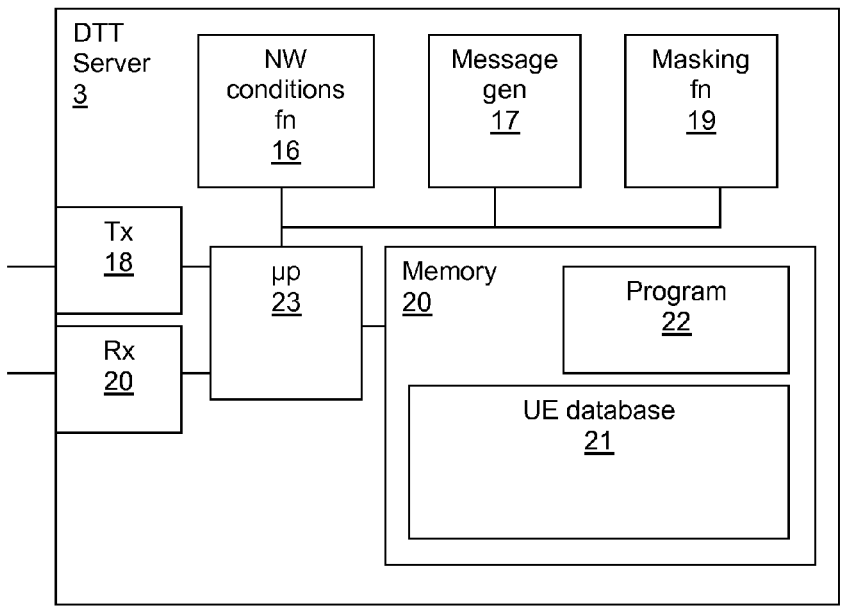
FIG. 4 illustrates schematically in a block diagram a network server according to an embodiment of the invention.

Referring to FIG. 4 a DTT server 3 is provided with a network determining function 16 for determining that network conditions are suitable for transmitting delay tolerant data traffic. Suitable conditions include, for example, a tolerable degree of congestion or packet loss. A message generation function 17 is provided for generating a grant message for informing the client device 1 that it is permitted to send or receive delay tolerant data traffic, and a transmitter 18 is provided for transmitting the grant message to the client device.

In one embodiment, the DTT server 3 is provided with a client device masking function 19 for selecting a set of client devices from a larger pool of client devices, and either transmitting the grant message to the selected set of client devices, or including information identifying the set of client devices in the grant message, such that the grant message is only valid for client devices belonging to the selected set of client devices in the case of a broadcast of the grant message.

Where the client device 1 must register with the DTT server 3, the DTT server 3 is provided with a receiver 20 for receiving a message indicating that the client device wishes to send or receive delay tolerant data traffic, and a memory 20 for storing an identity of the client device and the indication that the client device wishes to send or receive delay tolerant data traffic in a client device database 21.

The invention may be implemented such that the server functions described above are hardware functions or software functions. It will be appreciated that if the invention is implemented using software, then a program 22 may be stored on the computer readable memory 20, and a processor 23 is provided for executing the program.

It will be appreciated that the DTT server 3 may be a standalone server, or may be part of another network element such as a base station.

The following list of examples where the invention can be used is not an exhaustive list:
  Chat applications with specific signalling;
  News application cache refreshment with given an expiry time. In this example, the news may be delay tolerant to a certain maximum limit. For example, the news cannot be older than 1 hour but otherwise need not be sent immediately, so the system will choose the appropriate time for updating my application with the latest news within the expiry period;
  A large variety of machine-to-machine communications, e.g. sensor information uploads, etc
  P2P throttling policy in which the operator's own tracker will not offer a receiving peer another peer X if the receiving peer is located in a congested network; or if the receiving peer P2P data traffic is enforced to go via delay tolerant data traffic controls when the receiving peer has already exceeded a predetermined usage agreement;
  Non-urgent software update scheduling;
  Large file downloads, for example movies The invention improves network resource utilization by offering unused resources at given times, and reducing the amount of rejected traffic when the network is fully utilized. By establishing and running the system described in the invention, problems caused by future traffic growth will be mitigated, as the data traffic load can be more evenly distributed, both in time and geographical area. Both operators and subscribers will benefit from the invention, as even though there will be more traffic, networks will be utilized more efficiently and costs for the subscriber can be reduced.

It will be appreciated by the person of skill in the art that various modifications may be made to the above-described embodiments without departing from the scope of the invention as defined in the appended claims.

The invention claimed is:

1. A client device for use in a communications network, the client device comprising:
  an application configured to handle delay tolerant data traffic;
  a receiver circuit for receiving a grant permission message from a server in the communications network, the grant permission message informing the application that the application is permitted to send or receive delay tolerant data traffic;
  a processor circuit configured to:
    determine whether the grant permission message includes information identifying a set of client devices to which the client device belongs;
    in response to the permission message being determined to include the information identifying the set of client devices to which the client device belongs, allow the application to handle the delay tolerant data traffic.

2. A server for use in a communications network, the server comprising:
  a network determining unit configured to determine that network conditions are suitable for transmitting delay tolerant data traffic;
  a message generation unit configured to generate a grant message for informing a client device that it is permitted to send or receive delay tolerant data traffic;
  a transmitter for transmitting the grant message to the client device;
  a client device masking unit configured to select a set of client devices from a larger pool of client devices, wherein the larger pool of client devices is larger than the set of client devices by at least one client device;
  wherein the grant message is only valid for client devices belonging to the selected set of client devices when:
    the transmitter is configured to transmit the grant message only to the selected set of client devices; or
    the message generation unit is configured to include information identifying the selected set of client devices in the grant message.

3. The server according to claim 2 wherein the message generation unit is further configured to include further information in the grant message, the further information selected from at least one of:
  a grant time period;
  a maximum data rate in any of an uplink and downlink direction;
  a maximum bandwidth usable by delay tolerant data traffic in any of an uplink and downlink direction;
  a type of delay tolerant data traffic; and
  a location in which delay tolerant data traffic transmission or reception is allowed, the location being selected from one of a geographical location, a territory, and one or more network cells.

4. The server according to claim 2 the server further comprising:
  a receiver for receiving, from the client device, an indication that the client device wishes to send or receive delay tolerant data traffic;
  a memory for storing an identity of the client device and the indication that the client device wishes to send or receive delay tolerant data traffic;
  wherein the transmitter is further configured to transmit the grant message to only client devices identified in the memory.

5. A method of controlling data traffic in a communications network, the method comprising:

at a server, determining that network conditions are suitable for sending delay tolerant data traffic;

as a result of the determination, transmitting a grant message to at least one client device, the grant message informing the client device that the client device is permitted to send or receive delay tolerant data traffic;

prior to transmitting the grant message, selecting a set of client devices from a larger pool of client devices, wherein the larger pool of client devices is larger than the set of client devices by at least one client device;

wherein in transmitting the grant message comprises transmitting such that the grant message is only valid for client devices belonging to the selected set of client devices by either:

transmitting the grant message only to the selected set of client devices; or including information identifying the selected set of client devices in the grant message.

6. The method according to claim 5 wherein the grant message is sent as one of:
a unicast message to a particular client device;
a multicast message to particular client devices;
a broadcast message to all client devices in networks served by the server.

7. The method according to claim 5 wherein the grant message includes further information selected from at least one of:
a grant time period;
a maximum data rate in any of an uplink and downlink direction;
a maximum bandwidth usable by delay tolerant data traffic in an uplink direction or a downlink direction;
a type of delay tolerant data traffic; and
a location in which delay tolerant data traffic transmission or reception is allowed, the location being selected from one of a geographical location, a territory, and one or more network cells.

8. The method according to claim 5 further comprising:
at the server, determining that network conditions are no longer suitable for sending delay tolerant data traffic;
as a result of the determination, transmitting a stop message to the at least one client device, the stop message informing the client device that it is not permitted to send or receive delay tolerant data traffic.

9. The method according to claim 5 further comprising:
receiving, from the client device, an indication that the client device wishes to send or receive delay tolerant data traffic;
storing in a database an identity of the client device and the indication that the client device wishes to send or receive delay tolerant data traffic;
transmitting the grant message to only client devices identified in the database.

10. A computer program stored in a non-transitory computer readable medium, the computer program comprising computer readable code which, when executed on a client device, causes the client device to:

handle delay tolerant data traffic using an application;
receive a grant permission message from a server in the communications network, the grant permission message informing the application that the application is permitted to send or receive delay tolerant data traffic;
determine whether the grant permission message includes information identifying a set of client devices to which the client device belongs and, when the permission message includes the information identifying the set of client devices to which the client device belongs, allowing the application to handle delay tolerant data traffic.

11. A computer program stored in a non-transitory computer readable medium, the computer program comprising computer readable code which, when executed on a server, causes the server to:
determine that network conditions are suitable for transmitting delay tolerant data traffic;
generate a grant message for informing a client device that it is permitted to send or receive delay tolerant data traffic;
select a set of client devices from a larger pool of client devices, wherein the larger pool of client devices is larger than the set of client devices by at least one client device;
transmit the grant message to the client device such that the grant message is only valid for client devices belonging to the selected set of client devices by either:
transmitting the grant message only to the selected set of client devices; or
including information identifying the selected set of client devices in the grant message.

12. The computer program according to claim 11 wherein the computer readable code, when executed on a server, causes the server to include further information in the grant message, the further information selected from at least one of:
a grant time period;
a maximum data rate in any of an uplink and downlink direction;
a maximum bandwidth usable by delay tolerant data traffic in an uplink direction or a downlink direction;
a type of delay tolerant data traffic; and
a location in which delay tolerant data traffic transmission or reception is allowed, the location being selected from one of a geographical location, a territory, and one or more network cells.

13. The computer program according to claim 11 wherein the computer readable code, when executed on a server, causes the server to:
receive, from the client device, an indication that the client device wishes to send or receive delay tolerant data traffic;
store an identity of the client device and the indication that the client device wishes to send or receive delay tolerant data traffic;
transmit the grant message to only client devices identified in the memory.

* * * * *

UNITED STATES PATENT AND TRADEMARK OFFICE
CERTIFICATE OF CORRECTION

PATENT NO.         : 8,881,243 B2                                               Page 1 of 1
APPLICATION NO.    : 13/510685
DATED              : November 4, 2014
INVENTOR(S)        : Magyar et al.

It is certified that error appears in the above-identified patent and that said Letters Patent is hereby corrected as shown below:

Drawings

In Fig. 4, Sheet 3 of 3, delete "Rx 20" and insert -- Rx 20a --, therefor.

Specification

In Column 5, Line 10, delete "may server" and insert -- may serve --, therefor.

In Column 5, Line 57, delete "client device 2" and insert -- client device 1 --, therefor.

In Column 9, Line 18, delete "receiver 20" and insert -- receiver 20a --, therefor.

In Column 9, Line 45, delete "etc" and insert -- etc; --, therefor.

In Column 9, Line 53, delete "movies" and insert -- movies. --, therefor.

Signed and Sealed this
Twenty-eighth Day of June, 2016

Michelle K. Lee
*Director of the United States Patent and Trademark Office*